May 2, 1944.  L. A. McNABB  2,347,786
STRIP FEED SPROCKET
Filed Sept. 8, 1941
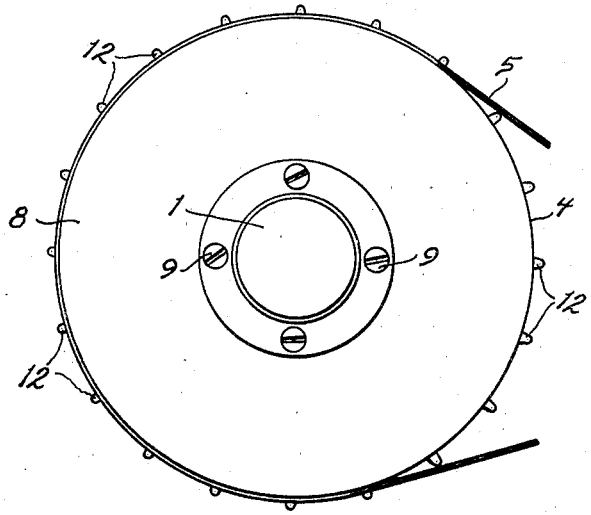
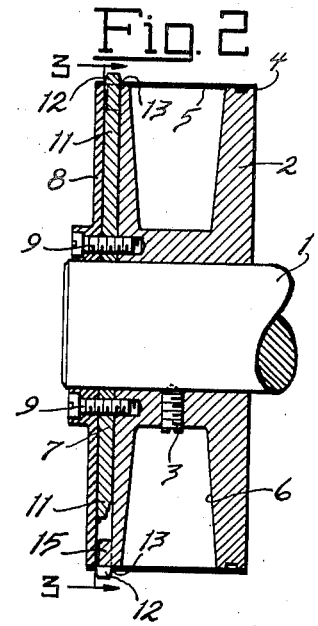
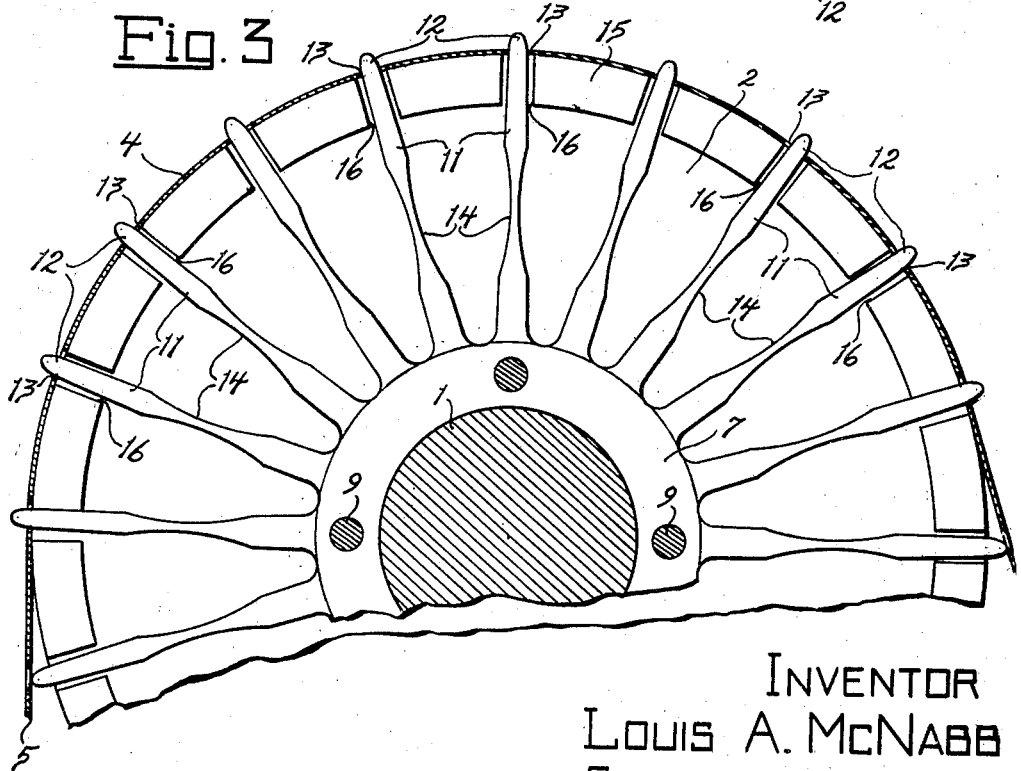
INVENTOR
LOUIS A. MCNABB
BY Robert F. Miehle, Jr.
ATTY.

Patented May 2, 1944

2,347,786

UNITED STATES PATENT OFFICE 2,347,786

STRIP FEED SPROCKET

Louis A. McNabb, Evanston, Ill., assignor to The Bell & Howell Company, Chicago, Ill., a corporation of Illinois Application September 8, 1941, Serial No. 410,050

2 Claims. (Cl. 74—243)

My invention has particular relation to a feed sprocket for photographic motion picture or sound record film strips provided with the usual longitudinally spaced feed perforations, and has for its principal object the provision of a feed sprocket which eliminates periodic jerk or unevenness in the feed of a strip incident to successive engagement or disengagement of the teeth of the sprocket with feed perforations of the strip and which accommodates for variance between the sprocket tooth spacing and strip perforation spacing, such as may be due to expansion or contraction of the strip, all with a view toward accurately uniform feed of the strip which is particularly important in the feed of photographic sound record strips.

The invention will be understood by reference to the accompanying drawing, in which—

Figure 1 is a side elevation of a feed sprocket of my invention having a film strip engaged thereon;

Figure 2 is a sectional view of the same taken in an axial plane thereof; and

Figure 3 is an enlarged partial sectional view substantially on the line 3—3 of Figure 2.

Referring to Figures 1, 2 and 3 of the drawing, 1 designates a suitably mounted rotatable driving shaft. An axially bored cylindrical sprocket body 2 is mounted by means of its bore on the shaft 1 and is secured therewith, as designated at 3, for rotation thereby. The periphery 4 of the sprocket body provides a supporting surface for a strip 5, such as a conventional photographic motion picture or sound record film strip, engaged thereabout, the sprocket body having a deep circumferential groove 6 dividing the strip support surface and disposed at the record portion of the strip engaged thereon.

An axially bored spider 7 is disposed between a face of the sprocket body 2 and an axially bored disk 8, and the spider and disk have their bores engaged on the shaft 1 and have their center portions secured with the sprocket body by means of headed screws 9 angularly spaced about the shaft 1 and passing through the spider and disk and screwthreaded into the sprocket body, the periphery of the disk having the same diameter as the strip support surface 4 or periphery of the sprocket body and extending such supporting surface.

The spider 7 is provided with a plurality of uniformly angularly spaced arms 11 radiating therefrom and providing at their outer ends sprocket teeth 12 uniformly angularly spaced about the sprocket body and projecting outwardly from the strip supporting surface 4 for driving engagement with usual longitudinally spaced feed perforations 13 of the strip 5 on the supporting surface 4.

The intermediate portions of the arms 11, inward of the supporting surface 4, are reduced in cross section angularly of the spider, as designated at 14 in Figure 3, to provide resilient portions to normally maintain the teeth 12 in uniformly spaced positions and to permit individual yielding movement of the teeth angularly of the sprocket out of said positions. The sprocket body 2 is provided with a peripheral flange 15 disposed in the plane of the spider 7 and provided with uniformly angularly spaced slots 16 of uniform width through which the arms 11 pass, and the sides of these slots form stops which limit movement of the teeth 12 out of their normal positions.

Individual yielding of the teeth 12 angularly of the sprocket yieldingly accommodates the spacing of the teeth with the spacing of the perforations 13 of the strip 5 engaged on the sprocket, with the result that a number of teeth are in actual driving engagement with the film and that jerkiness of movement of the film, ordinarily incident to engagement and disengagement of the teeth with the strip perforations, is greatly lessened if not entirely eliminated. Accordingly, any slippage of the film on the sprocket periphery, incident to variation between the normal sprocket tooth spacing and the strip perforation spacing is correspondingly uniform.

While I have thus described my invention, I do not wish to be limited to the precise details described, as changes may be readily made without departing from the spirit of my invention, but having thus described my invention, I claim as new and desire to secure by Letters Patent the following:

1. In a strip feed sprocket, the combination with means providing a peripheral strip supporting surface, of sprocket teeth spaced angularly about the sprocket for engagement with feed perforations of a strip on said supporting surface, resilient shanks on said teeth and extending radially inward from said surface and rigidly fixed together only at their inner ends and operative to normally maintain said teeth in uniformly spaced positions and to permit individual yielding movement of said teeth angularly of the sprocket out of said positions, and positive stop means in the region of said supporting surface and operative to limit said movement of said teeth out of said positions.

2. In a strip feed sprocket, the combination with a sprocket body providing a peripheral strip supporting surface, of a one-piece spider secured with said body in the region of the axis of the sprocket and provided with a plurality of angularly spaced arms radiating therefrom and providing at their outer ends sprocket teeth spaced angularly about the sprocket for engagement with perforations of a strip on said supporting surface, said arms being reduced in cross section angularly of said spider and inwardly of said surface to provide resilient portions to normally maintain said teeth in uniformly spaced positions and to permit individual yielding movement of said teeth angularly of the sprocket out of said positions, and said sprocket body being provided with a peripheral flange portion provided with angularly spaced radial slots therethrough and through which said arms pass and forming positive stops operative to limit said movement of said teeth out of said positions.

LOUIS A. McNABB.